Patented June 28, 1927.

1,633,866

UNITED STATES PATENT OFFICE.

ARTHUR LÜTTRINGHAUS, OF MANNHEIM, HEINRICH NERESHEIMER, OF LUDWIG-SHAFEN-ON-THE-RHINE, AND HUGO WOLFF, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

MANUFACTURE OF CONDENSATION PRODUCTS AND DYESTUFFS OF THE BENZANTHRONE SERIES.

No Drawing. Application filed October 16, 1925, Serial No. 62,934, and in Germany October 25, 1924.

The present invention relates to improvements in the manufacture of intermediates and vat dyestuffs of the benzanthrone series. As is known to those skilled in the art, benzanthrone when treated with strong alkaline condensing agents can be converted into dibenzanthrone, while an isomeric dyestuff, isodibenzanthrone, is obtained by first halogenating benzanthrone and condensing the Bzl-halogen-benzanthrones with fused alkalis or with alkali metal alcoholates (see Annalen der Chemie vol. 394, page 128).

We have now found that isodibenzanthrones can be obtained in a much more advantageous manner and that new members of said group can be obtained by condensation with the aid of alkaline condensing agents of mixtures of Bzl-halogen-benzanthrones and benzanthrone itself or such derivatives thereof as possess a free Bzl-position. Not only is this method cheaper as only part of the benzanthrone has to be halogenated, but the reaction proceeds with better yields and leads to purer products. Generally, about equimolecular amounts of the Bzl-halogen compound and the Bzl-unsubstituted compound should be chosen, but an excess of the Bzl-halogen-benzanthrone may also be employed. Various alkaline condensing agents suitable for effecting condensations of the kind in question may be used but as a particularly suitable condensing medium we mention mixtures of caustic alkalis and alkali metal alcoholates in the presence of an inert diluent. Such mixtures can be readily prepared from a caustic alkali and a restricted quantity of an alcohol, and the benzanthrone bodies and the diluent may already be present when mixing the alkali and alcohol. Oxygen should be excluded as far as possible, to which end a current of an inert gas is passed through the mixture or vessel during the reaction. Very good yields are also obtained with metal arylides as condensing agents. In all cases the benzanthrone as well as the Bzl-halogen-benzanthrone body must also contain the 2-position unsubstituted.

We have further found that as an intermediary product of the reaction a 2-Bzl'-dibenzanthronyl body is formed of which the 2-Bzl'-dibenzanthronyl itself corresponds to the formula:

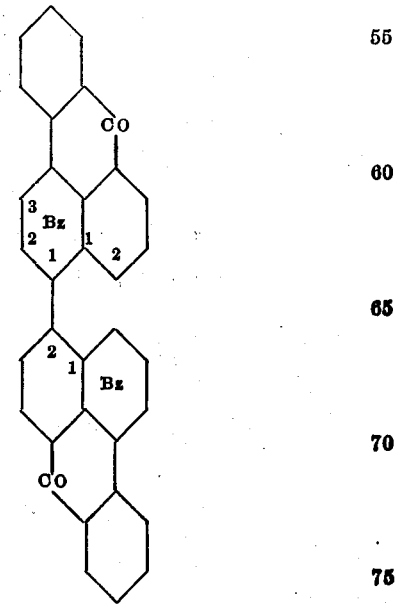

which intermediate can be obtained by employing more moderate conditions of the reaction in particular a lower temperature in such a way that the formation of dyestuffs is small or does not take place at all, and any admixture of dyestuff produced simultaneously can be separated by usual methods. The said intermediates can be transformed into vat dyestuffs in a separate operation by the action of condensing agents of an alkaline or acid nature. Such agents may at the same time be halogenating agents when in some cases halogenated dyestuffs will be obtained.

We do not claim in this application the process of manufacturing isodibenzanthrones and the vat coloring matters obtained thereby, such being claimed in the divisional application, Ser. No. 153,724, filed December 9th, 1926.

The aforesaid invention is more fully explained by the following examples to which however the invention is not limited. The parts are by weight.

*Example 1.*

A mixture of 20 parts of pure benzanthrone and 23 parts of pure Bzl-chlor-benzanthrone is introduced, in a current of nitrogen, into a mixture of 30 parts of sodium anilide in aniline (prepared from 6 parts of sodium and 400 parts of dry aniline) which is cooled to a temperature of 5 degrees centigrade. In the course of introducing, the temperature rises to 12 degrees centigrade at which it is kept for several hours, while stirring, whereupon the aniline is dissolved in an excess of dilute hydrochloric acid. The precipitate is filtered off and heated with acetone until practically no soluble matter is extracted. Crude 2-Bzl'-dibenzanthronyl corresponding to the formula given above is left as a greenish yellow powder. By purifying from boiling xylene it can be obtained in yellow needles of about 326 degrees centigrade melting point. The difference from the known 2.2'-dibenzanthronyl corresponding to the formula

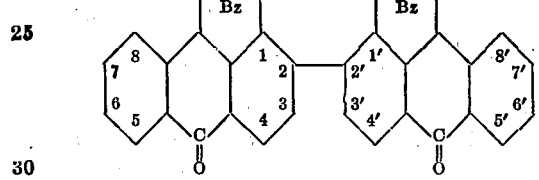

of 325 degrees melting point can be proved by the much lower melting point of a mixture of the two dibenzanthronyls. The new compound dissolves in cold concentrated or fuming sulfuric acid bright crimson red. The solution in fuming sulfuric acid of 23 per cent after a short while assumes an intense brick red fluorescence.

In the above example instead of sodium anilide, the sodium compound of mono-methyl-aniline, dissolved in mono-methyl-aniline may be employed.

*Example 2.*

When working in accordance with Example 1, but substituting for pure benzanthrone 23 parts of 6-chlor-benzanthrone (Berichte der deutschen chemischen Gesellschaft, vol. 55, page 114), 6-chlor-2.Bzl'-dibenzanthronyl of the formula

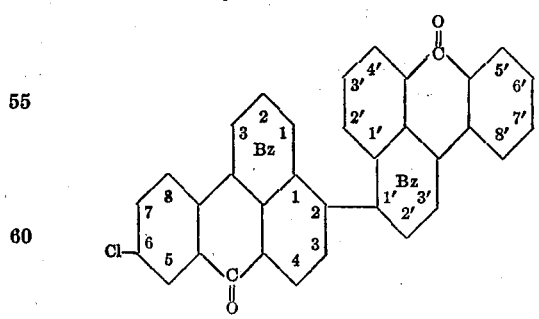

is obtained as a brown powder. When redissolved from xylene preferably with an addition of animal charcoal it forms brownish yellow needles which do not melt at 360 degrees centigrade. With concentrated or fuming sulfuric acid they give a clear crimson red solution, and practically no fluorescence can be observed with the latter acid even after a prolonged standing. When effecting the condensation at a more elevated temperature, more or less dyestuff is formed which may be extracted by means of alkaline hydrosulfite solution, or otherwise.

With 7-chlor-benzanthrone (see Berichte, vol. 55, page 115), 7-chlor-2.Bzl'-dibenzanthronyl which corresponds to the formula

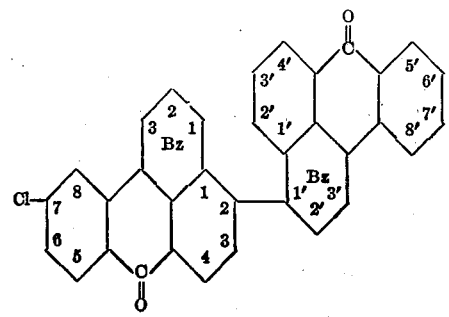

is obtained. When recrystallized it melts in the neighbourhood of 360 degrees. Its solution in concentrated sulfuric acid is a little more yellowish than that of the 6-chlor derivative and exhibits a distinct yellowish red fluorescence; also the solution in fuming sulfuric acid of 23 per cent assumes a fluorescence when allowed to stand.

With 6-methyl-benzanthrone (see German Patent 239,761) instead of benzanthrone in Example 1, 6-methyl-2.Bzl'-dibenzanthronyl corresponding to the formula

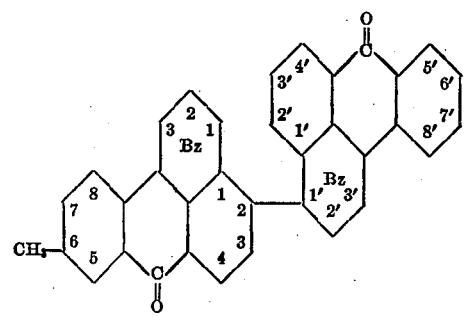

is obtained as a yellowish green powder, melting after recrystallization above 360 degrees centigrade and dissolving in concentrated or fuming sulfuric acid crimson red without fluorescence.

*Example 3.*

10 parts of pure benzanthrone, 11.5 parts of pure Bzl-chlor-benzanthrone and 60 parts of finely powdered caustic potash are suspended in 240 parts of toluene, and 24 parts of ethyl alcohol allowed to run in at between 10 degrees and 15 degrees centigrade and in an atmosphere of nitrogen. The said temperature is kept while stirring until the reaction is complete, whereupon the toluene is driven off with steam and the residual liquor filtrated and the precipitate freed from readily soluble by-products by washing with alcohol or acetone and crystallized from benzene or xylene. 2.Bzl'-dibenzanthronyl, as described in Example 1, is obtained.

We claim:

1. The process of manufacturing derivatives of the benzanthrone series which consists in condensing a mixture of a benzanthrone body, not substituted in 2- and in Bzl-position, with a Bzl-halogen-benzanthrone body with a free 2-position, by means of an alkaline condensing agent.

2. The process of manufacturing derivatives of the benzanthrone series which consists in condensing a mixture of a benzanthrone body with free 2- and Bzl-positions and a Bzl-halogen-benzanthrone with a free 2-position, by means of an alkaline condensing agent to a dibenzanthronyl body which is no coloring matter at a more moderate temperature than that leading to a substantial formation of vat coloring matter.

3. As new articles of manufacture, 2.Bzl'-dibenzanthronyls.

4. As a new article of manufacture, 2.Bzl'-dibenzanthronyl which when treated with alkali metal alcoholate gives isodibenzanthrone.

In testimony whereof we have hereunto set our hands.

ARTHUR LÜTTRINGHAUS.
HEINRICH NERESHEIMER.
HUGO WOLFF.